(12) United States Patent
Lee et al.

(10) Patent No.: US 7,847,890 B2
(45) Date of Patent: Dec. 7, 2010

(54) OCB MODE LIQUID CRYSTAL DISPLAY COMPRISING EDGES OF ADJACENT COLOR FILTERS BEING SAWTOOTHED SO AS TO FORM A SAWTOOTHED STEP STRUCTURE

(75) Inventors: Chia-Yu Lee, Taipei Hsien (TW); Ting-Jui Chang, Taipei (TW); Po-Lun Chen, Chia Yi (TW); Jeng-Fang Wu, Kaohsiung Hsien (TW)

(73) Assignee: AU Optronics Corp., Hsinchu (TW)

( * ) Notice: Subject to any disclaimer, the term of this patent is extended or adjusted under 35 U.S.C. 154(b) by 358 days.

(21) Appl. No.: 11/491,143

(22) Filed: Jul. 24, 2006

(65) Prior Publication Data

US 2007/0177095 A1 Aug. 2, 2007

(30) Foreign Application Priority Data

Jan. 27, 2006 (TW) .............................. 95103616 A

(51) Int. Cl.
*G02F 1/1335* (2006.01)
(52) U.S. Cl. .................... 349/106; 349/109; 349/33; 349/169
(58) Field of Classification Search .......... 349/106–109
See application file for complete search history.

(56) References Cited

U.S. PATENT DOCUMENTS

| | | | |
|---|---|---|---|
| 6,600,540 B2 | 7/2003 | Yamakita et al. | |
| 6,661,488 B1 | 12/2003 | Takeda et al. | |
| 6,839,104 B2 * | 1/2005 | Taniguchi et al. | 349/106 |
| 7,180,567 B2 * | 2/2007 | Ikeda et al. | 349/155 |
| 2002/0060764 A1 | 5/2002 | Taniguchi et al. | |
| 2004/0075788 A1 * | 4/2004 | Cheng | 349/106 |
| 2004/0150777 A1 * | 8/2004 | Koike | 349/106 |
| 2004/0257500 A1 * | 12/2004 | Kim et al. | 349/106 |
| 2005/0140842 A1 | 6/2005 | Kim et al. | |
| 2005/0253984 A1 * | 11/2005 | Kim et al. | 349/106 |
| 2006/0028598 A1 * | 2/2006 | Lee et al. | 349/107 |
| 2006/0221287 A1 * | 10/2006 | Roh | 349/139 |

FOREIGN PATENT DOCUMENTS

| | | |
|---|---|---|
| CN | 1466010 A | 1/2004 |
| CN | 1637555 A | 7/2005 |
| JP | 2003-66491 A | 3/2003 |

\* cited by examiner

*Primary Examiner*—Andrew Schechter
*Assistant Examiner*—Charles Chang
(74) *Attorney, Agent, or Firm*—Birch, Stewart, Kolasch & Birch, LLP

(57) ABSTRACT

An optical compensated bend (OCB) mode liquid crystal display (LCD) includes a pixel electrode, a color filter, a common electrode and a liquid crystal layer. The pixel electrode is formed on the first substrate of the OCB mode LCD. The color filter is formed on the second substrate of the OCB mode LCD. The common electrode is formed on the color filter. The liquid crystal layer is sandwiched between the first substrate and the second substrate. A step structure is formed on the second structure, so that the liquid crystal molecules in the liquid crystal layer are twisted into the bend state from the splay state uniformly and quickly.

6 Claims, 5 Drawing Sheets

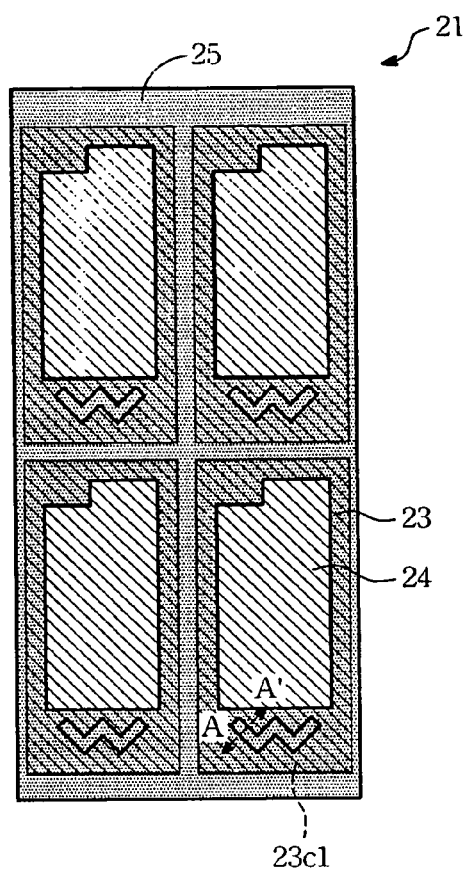
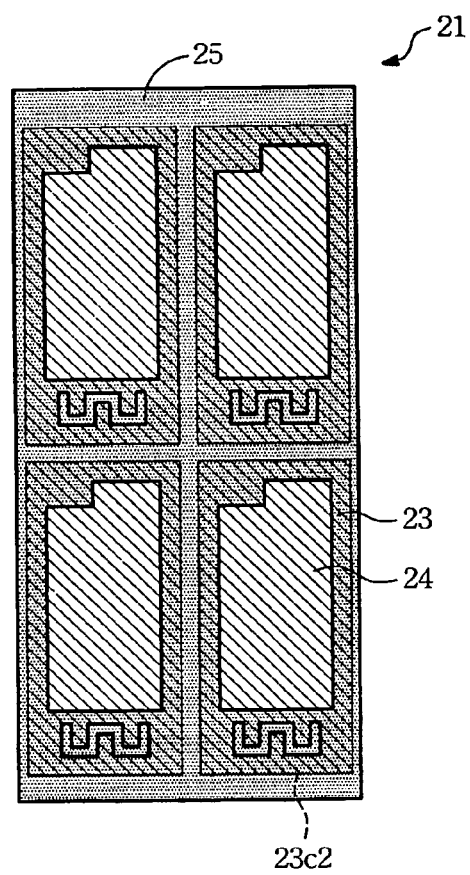
FIG.5A  FIG.5C
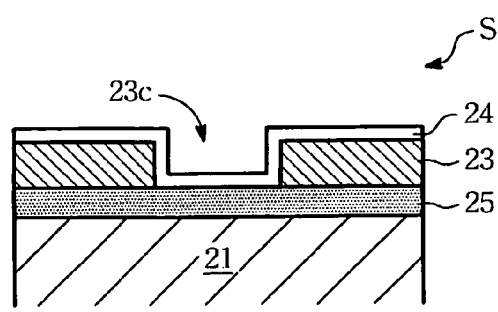
FIG.5B

OCB MODE LIQUID CRYSTAL DISPLAY COMPRISING EDGES OF ADJACENT COLOR FILTERS BEING SAWTOOTHED SO AS TO FORM A SAWTOOTHED STEP STRUCTURE

BACKGROUND OF THE INVENTION (1) Field of the Invention

The present invention relates to an optical compensated bend (OCB) mode liquid crystal display (LCD), and more specifically to an OCB mode LCD including a display panel that is capable of accelerating the transition of liquid crystal molecules from splay alignment into bend alignment.

(2) Description of the Prior Art

Liquid crystal displays (LCDs) are compact in size, lightweight, in addition to low power consumption and lower radiation. Due to these meritorious features, LCDs are widely used in personal digital assistants (PDA), notebook computers, digital cameras, video cams, mobile phones, and many other electronic devices. The manufacturers worldwide have devoted themselves to further research and thus improve the materials, processes and equipments. The display qualities of LCDs are accordingly and largely promoted while the cost goes down day-by-day, which, in turn causes a wider use of LCD.

In order to improve the response speed of the liquid crystal molecules and to widen the viewing angle of the display panel, researches related to the material characteristics of the liquid crystal molecules are conducted. Presently, three methods are proposed, namely: (1) the vertical alignment liquid crystal mode; (2) low-viscosity liquid crystal molecules; and (3) the optically compensated bend (OCB) mode.

With the vertical alignment mode, the liquid crystal molecules align with the alignment film and change their orientation rapidly into the vertical direction when a voltage is applied to the pixel electrode. Research conducted on the low-viscosity liquid crystal material indicates that the response time is directly related to the viscosity of the liquid crystal molecules. Shorter response time can be obtained with low-viscosity liquid crystal molecules.

In the OCB mode LCD, the liquid crystal molecules near the upper and lower glass substrates are oriented in parallel directions while the liquid crystal molecules therebetween in the liquid crystal layer are not twisted but are operated in the bent alignment state with respect to a vertical plane. Such type of bent alignment can result in double refraction of the light. A biaxial retardation film is generally used to compensate the axial phase difference so as to overcome the restricted viewing angle caused by the parallel alignment of the liquid crystal molecules on the boundaries. In addition, the liquid crystal molecules in the OCB mode require fast response time of 1-10 ms to switch between dark and bright state operation when compared to the liquid crystal molecules of the TN (twisted nematic) mode which require a response time of about 50 ms.

Note that, though the OCB mode LCD has the aforesaid advantages, there still exist some disadvantages, such as the requirement of a longer warming-up time in order to perform the transition of the liquid crystal molecules in the liquid crystal layer from the splay alignment into the bend alignment. In the presently available OCB mode of LCD, a high voltage is generally applied to the liquid crystal layer in order to quicken the transition of the liquid crystal molecules of the liquid crystal layer from the splay alignment into the bend alignment. FIGS. 1A and 1B respectively show the liquid crystal molecules 10 in the splay alignment state and the bend alignment state. When a predetermined voltage is applied on the common electrode 12 and the pixel electrode 14, the molecules 10 of FIG. 1A in the splay alignment are changed into the bent alignment of FIG. 1B after being twisted.

In order to accelerate the transition of the molecules 10 from the splay alignment into the OCB mode, a high voltage is usually applied between the common and pixel electrodes 12, 14 and to the liquid crystal layer therebetween. However, such method cannot uniformly and rapidly transit all the molecules into the required bent mode. Under this condition, the display panel of the LCD is unable to display the images in the normal condition.

In order to form a larger voltage difference between the common electrode 14 and the pixel electrode 12, the design of the driver chip for the display panel have to be altered, or, the design of the pixel pattern have to be modified. However, these result in extra production cost. Therefore, the manufacturers are in the trend to produce an LCD having a display panel that is capable of accelerating the transition of the molecules from the splay alignment into the bent alignment.

SUMMARY OF THE INVENTION

An optical compensated bend (OCB) mode liquid crystal display (LCD) is provided by the present invention. Liquid crystal molecules in the OCB mode LCD of the present invention are twisted into the bend state from the splay state quickly, for displaying an image.

The OCB mode LCD includes a pixel electrode, a color filter, a common electrode and a liquid crystal layer. The pixel electrode is formed on a first substrate of the OCB mode LCD. The color filter is formed on a second substrate of the OCB mode LCD and corresponds to the pixel electrode. The common electrode is form on the color filter.

The liquid crystal layer is sandwiched between the pixel electrode and the common electrode. When an electric field is applied between the pixel electrode and the common electrode, liquid crystal molecules in the liquid crystal layer are affected by the electric field. The liquid crystal molecules are twisted into the bend state from the splay state.

What is worth mentioning is that a step structure is disposed on the second structure. Through the disposition of the step structure, the liquid crystal molecules are arranged at an angle to an alignment direction resulted from an alignment layer in the initial state. As a result, the liquid crystal molecules remain in a state close to twisting. Also, the step structure changes the distribution of the electric field in a pixel element, so that the liquid crystal molecules are affected by the changed electric field to have a pre-inclined angle.

Therefore, when the electric field is applied between the pixel electrode and the common electrode, the liquid crystal molecules in the liquid crystal layer are twisted into the bend state from the splay state uniformly and quickly.

These and other objectives of the present invention will no doubt become obvious to those of ordinary skill in the art after reading the following detailed description of the preferred embodiment which is illustrated in the various figures and drawings.

BRIEF DESCRIPTION OF THE DRAWINGS

The present invention will now be specified with reference to its preferred embodiment illustrated in the drawings, in which FIG. 1A and FIG. 1B respectively show the liquid crystal molecules 10 in the splay alignment state and the bend alignment state.

FIG. 5A is a top view of the second substrate of the OCB mode LCD according to the third embodiment of the present invention;

FIG. 5B is a cross-sectional view of the second substrate in FIG. 5A taken along a section line A-A'; and FIG. 5C illustrates another pattern of the step structure disposed on the second substrate according to the present invention

DESCRIPTION OF THE PREFERRED EMBODIMENTS

Figure 1A:
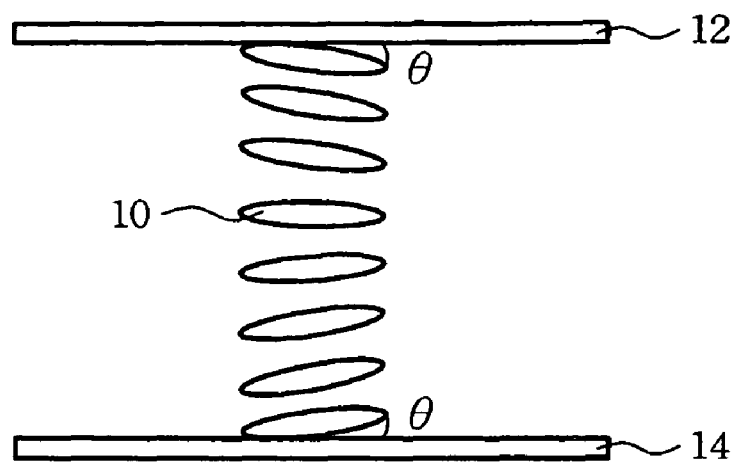
Figure 1B:
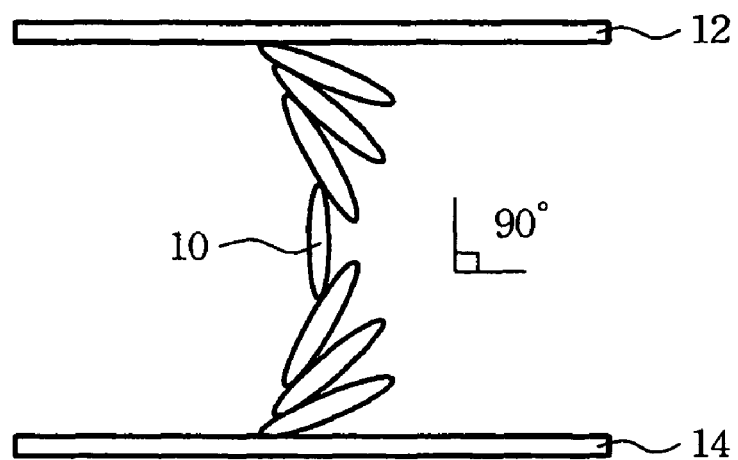
Figure 2:
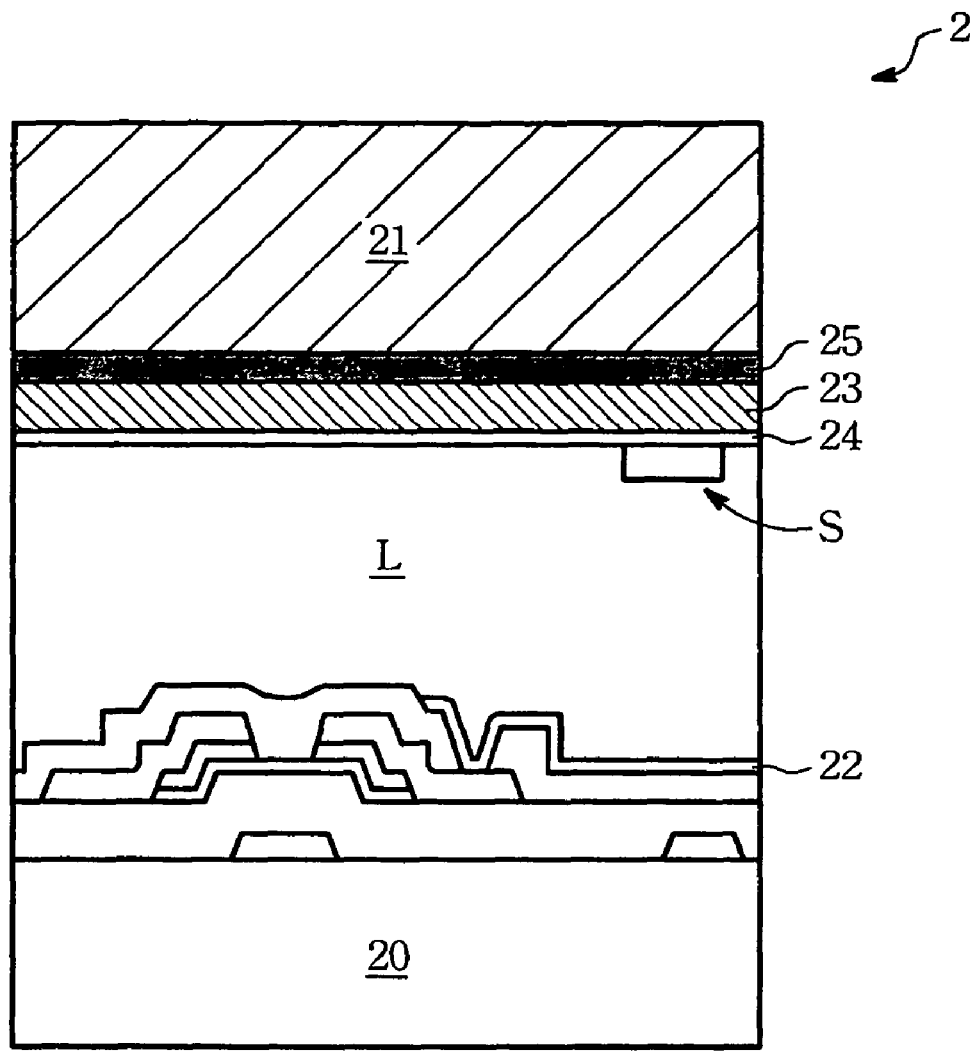
FIG. 2 is a cross-sectional view of an OCB mode LCD according to the first embodiment of the present invention.

Please refer to FIG. 2. FIG. 2 is a cross-sectional view of an optical compensated bend (OCB) mode liquid crystal display (LCD) according to the first embodiment of the present invention. A liquid crystal display 2 is assembled by the first substrate 20 and the second substrate 21. A liquid crystal layer L is sandwiched between the first substrate 20 and the second substrate 21. The OCB mode LCD 2 further includes a pixel electrode 22, a color filter 23 and a common electrode 24.

As shown in FIG. 2, the pixel electrode 22 is formed on the first substrate 20 of the OCB mode LCD 2. In general, other components, such as scan lines, data lines, thin film transistors and common lines, are disposed on the first substrate 20. The thin film transistors are turned on or turned off by the electric signals inputted by the scan lines. As a result, the voltage signals of the data lines are applied to the pixel electrode 22.

The color filter 23 is formed on the second substrate 21 of the OCB mode LCD and corresponds to the pixel electrode 22.

The common electrode 24 is formed on the color filter 23. When an electric field is generated between the pixel electrode 22 and the common electrode 24, the liquid crystal molecules in the liquid crystal layer L are affected by the electric field. As a result, the liquid crystal molecules are twisted into the bend state from the splay state.

What is worth mentioning is that a step structure S is disposed on the second substrate 21. Through the disposition of the step structure S, the liquid crystal molecules adjacent to the step structure S in the liquid crystal layer L are affected by the step structure S. As a result, the initial states of the liquid crystal molecules remain in the splay state to be twisted into the bend state easily and quickly. Furthermore, through collisions between the liquid crystal molecules, the arrangement of the liquid crystal molecules adjacent to the step structure S spreads to the whole liquid crystal layer L. Therefore, each liquid crystal molecule in the whole liquid crystal layer L remains in the state to be twisted easily and quickly. When an electric field is formed between the pixel electrode 22 and the common electrode 24, the liquid crystal molecules in the liquid crystal layer L are twisted into the bend state from the splay state quickly and uniformly.

Figure 3A:
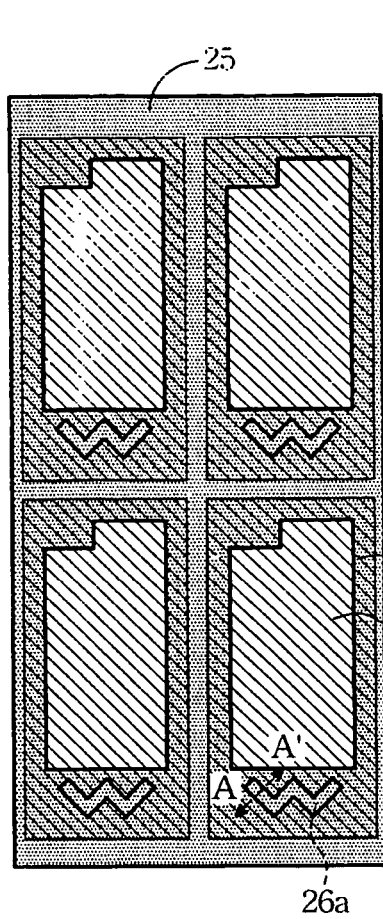
FIG. 3A is a top view of the second substrate according to the first embodiment of the present invention.
Figure 3C:
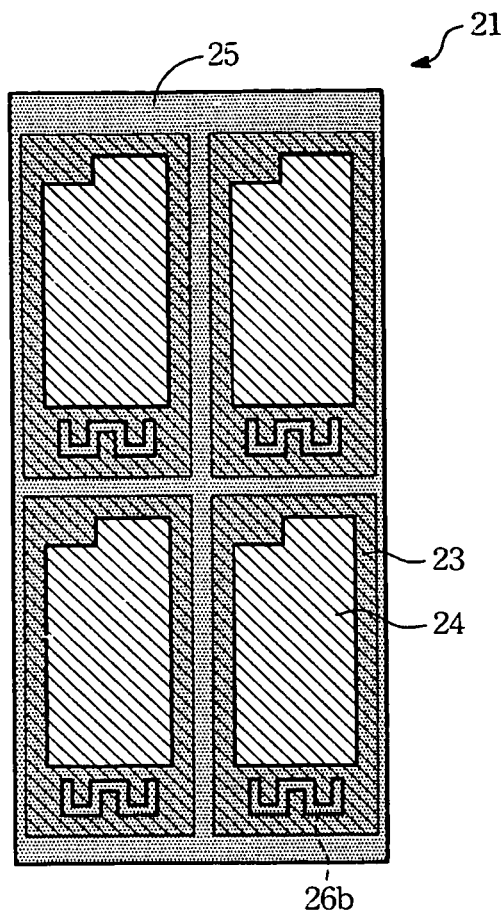
FIG. 3C illustrates a pattern of the step structure disposed on the second substrate according to the present invention.
Figure 3B:
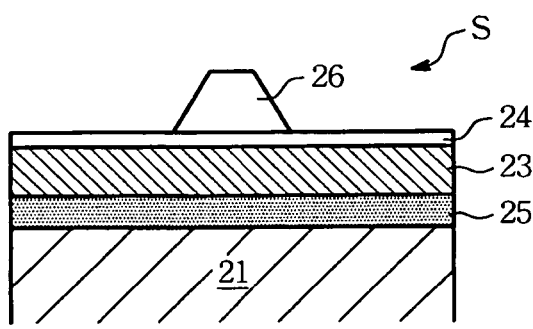
FIG. 3B is a cross-sectional view of the second substrate in FIG. 3A taken along a section line A-A'.

The step structure S is illustrated further as follow. Please refer to both FIG. 3A and FIG. 3B. FIG. 3A is a top view of the second substrate according to the present invention. FIG. 3B is a cross-sectional view of the second substrate in FIG. 3A taken along a section line A-A'.

As shown in FIG. 3B, a black matrix (BM) 25 is formed over the second substrate 21. The color filter 23 is formed over the black matrix 25 so that the black matrix 25 is sandwiched between the second substrate 21 and the color filter 23. The common electrode 24 is formed on the color filter 23.

A bump 26 is disposed on the common electrode 24. In a preferred embodiment, the disposition pattern of the bump 26 is shown in FIG. 3A. The bump 26 disposed on the common electrode 24 has a sawtooth pattern so that the step structure S (FIG. 3B) is formed on the common electrode 24. The bump 26 can be made of an organic material or similar materials.

Through the above structure, the liquid crystal molecules adjacent to the bump 26 are arranged according to the shape of the bump 26. As a result, the initial states of the liquid crystal molecules remain in the splay state to be twisted into the bend state easily and quickly. Meanwhile, this state spreads to the whole liquid crystal layer L so that the liquid crystal molecules in the whole liquid crystal layer remain in the state to be twisted into the bend state easily and quickly. Therefore, the time to twist the liquid crystal molecules to the bend state from the splay state is shortened.

What is worth mentioning is that the disposition of the step structure S formed by the bump 26 is not limited to the sawtooth pattern 26a. For example, the step structure S formed by the bump 26 can be arranged as shown in FIG. 3C. The bump 26 disposed on the common electrode 24 has a continuous pattern 26b with several bending sections. Although the continuous pattern 26b with several bending sections in FIG. 3C is illustrated as a right-angle pattern with several bending sections, the embodiments of the invention include an oblique pattern with several bending sections and an oblique pattern with single bending section.

Figure 4A:
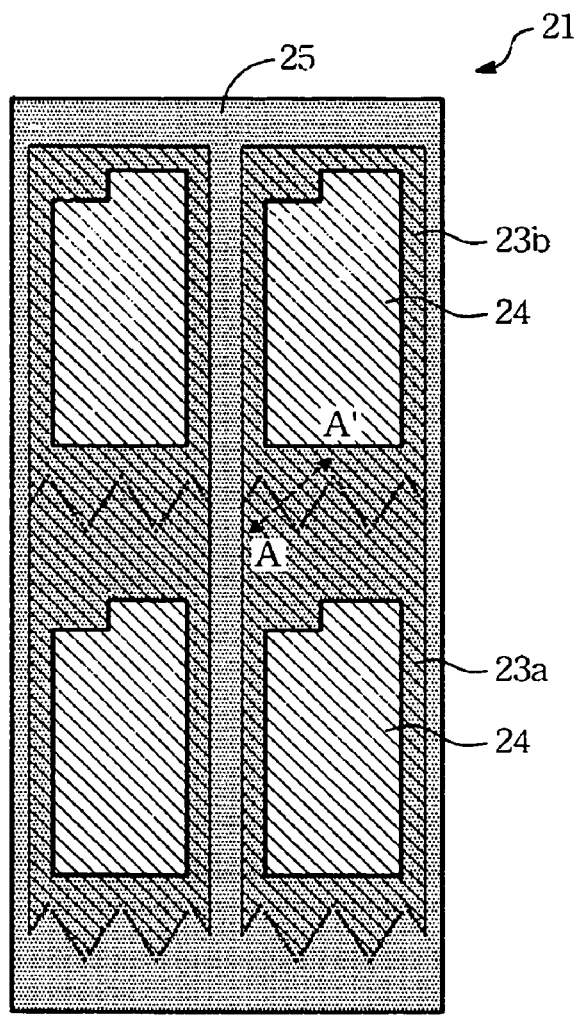
FIG. 4A is a top view of the second substrate according to the second embodiment of the present invention.
Figure 4B:
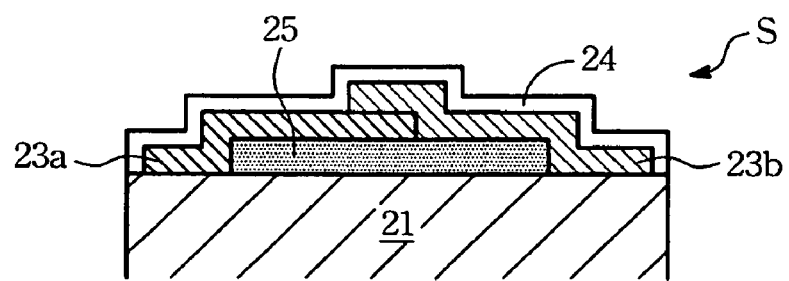
FIG. 4B is a cross-sectional view of the second substrate in FIG. 4A taken along a section line A-A.

FIG. 4A is a top view of the second substrate of the OCB mode LCD according to the second embodiment of the present invention. FIG. 4B is a cross-sectional view of the second substrate in FIG. 4A taken along a section line A-A.

Generally speaking, the color filter 23 includes several color resistors, such as a red resistor, a green resistor, and a blue resistor. Light is filtered by the color resistors of different colors to display a color image. In the present embodiment, the step structure S is formed by overlapping two adjacent color resistors 23a and 23b. Specifically speaking, the black matrix 25 is formed over the second substrate 21. The color resistors 23a and 23b are formed over the black matrix 25 respectively to form the step structure S. In the present embodiment, the color resistor 23b overlaps the color resistor 23a. The side of the color resistor 23b has a sawtooth pattern.

As shown in FIG. 4B, the common electrode 24 is formed over the step structure S. In a preferred embodiment, the common electrode 24 positioned over the step structure S is conformal to the step structure S. It is to say that the step structure is formed by a portion of the black matrix and the two overlapping edges of the two adjacent color resistors, and the edges of the at least two adjacent color resistors are sawtoothed so as to foam a sawtoothed step structure. A shape of the sawtoothed is composed of at least two V linked together.

FIG. 5A is a top view of the second substrate of the OCB mode LCD according to the third embodiment of the present invention. FIG. 5B is a cross-sectional view of the second substrate in FIG. 5A taken along a section line A-A'.

As stated above, the color filter includes several color resistors. At least one resistor has an opening 23c to form the step structure S. As shown in FIG. 4B, when a color resistor is formed on the black matrix 25, the color resistor is cut to form the opening 23c. As a result, a portion of the black matrix 25 is exposed. Then, the common electrode 24 is formed over the color resistor.

In the embodiment illustrated in FIG. 5A, the opening 23c over the color resistor 23 has a sawtooth pattern 23c1. In other embodiments, the opening 23c over the color resistor 23 can be a tooth pattern 23c2 as shown in FIG. 5C.

Although the openings in FIG. 3A, FIG. 3C, FIG. 4A, FIG. 5A and FIG. 5C have continuous tooth or sawtooth patterns, the embodiments of the invention include discontinuous patterns. The shape of the pattern is not limited to tooth or sawtooth patterns.

Based on the above, the initial states of the liquid crystal molecules in the OCB mode LCD of the invention remain in a state to be twisted quickly due to the step structure. When an electric field is generated between the common electrode and a pixel electrode, the liquid crystal molecules are twisted into the bend state from the splay state quickly and uniformly for displaying an image. Also, the warm-up time of the OCB mode LCD is shortened greatly. Furthermore, according to the present invention, the original manufacturing process is not required to be changed enormously to form the step structure. The step structure is easily formed and highly practical.

With the example and explanations above, the features and spirits of the invention are hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. An optical compensated bend (OCB) mode liquid crystal display (LCD) comprising:
    a first substrate;
    a second substrate;
    a pixel electrode formed on the first substrate;
    a black matrix formed on the second substrate;
    a color filter formed on the second substrate and the black matrix, wherein the color filter has a plurality of color resistors, and entire adjacent edges of at least two adjacent color resistors lie over each other on the black matrix to form a step structure;
    a common electrode formed on the color filter; and
    a liquid crystal layer sandwiched between the first substrate and the second substrate,
    wherein the edges of the at least two adjacent color resistors are sawtoothed so as to form a sawtoothed step structure and a shape of the sawtoothed is composed of at least two V linked together.

2. The OCB mode LCD of claim 1, wherein the step structure is formed by a portion of the black matrix and the two overlapping edges of the two adjacent color resistors.

3. The OCB mode LCD of claim 1, wherein the common electrode positioned over the step structure is conformal to the step structure.

4. An optical compensated bend (OCB) mode liquid crystal display (LCD) comprising:
    a first substrate;
    a second substrate;
    a pixel electrode formed on the first substrate;
    a black matrix formed on the second substrate;
    a color filter formed on the second substrate and the black matrix, wherein the color filter has a plurality of color resistors, and edges of at least two adjacent color resistors overlap on the black matrix to form a two-step structure;
    a common electrode formed on the color filter; and
    a liquid crystal layer sandwiched between the first substrate and the second substrate,
    wherein the edges of the at least two adjacent color resistors are sawtoothed so as to form a sawtoothed two-step structure and a shape of the sawtoothed is composed of at least two V linked together.

5. The OCB mode LCD of claim 4, wherein the two-step structure is formed by a portion of the black matrix and the two overlapping edges of the two adjacent color resistors.

6. The OCB mode LCD of claim 4, wherein the common electrode positioned over the two-step structure is conformal to the two-step structure.

* * * * *